(12) United States Patent
Kaas et al.

(10) Patent No.: US 6,911,242 B2  
(45) Date of Patent: *Jun. 28, 2005

(54) DIENOPHILE ADDITIVES TO POLYVINYLIDENE CHLORIDE COPOLYMERS

(75) Inventors: Roger Kaas, Sherwood, WI (US); Chad Mueller, Appleton, WI (US)

(73) Assignee: Pechiney Emballage Flexible Eruope (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/341,702

(22) Filed: Jan. 14, 2003

(65) Prior Publication Data

US 2003/0113570 A1 Jun. 19, 2003

Related U.S. Application Data

(63) Continuation of application No. 09/649,895, filed on Aug. 28, 2000, now Pat. No. 6,514,626.

(51) Int. Cl.[7] .............................................. B29D 22/00
(52) U.S. Cl. .................. 428/36.6; 428/36.7; 428/314; 428/361; 428/518; 428/520
(58) Field of Search ................ 428/518, 520, 428/36.6, 36.7, 314, 361

(56) References Cited

U.S. PATENT DOCUMENTS

| | | |
|---|---|---|
| 2,384,886 A | 9/1945 | Britton |
| 3,935,164 A | 1/1976 | Spivack et al. |
| 4,086,204 A | 4/1978 | Cassandrini et al. |

(Continued)

FOREIGN PATENT DOCUMENTS

| | | | |
|---|---|---|---|
| AU | 734008 | | 1/1998 |
| EP | 0 323 122 | | 7/1989 |
| JP | 510713343 | * | 6/1976 |

OTHER PUBLICATIONS

Vinylidene Chloride and Poly(Vinylidene Chloride) Kirk–Othmer: Encyclopedia of Chemical Technology, 3rd Ed., vol. 23 (New York: John Wiley & Sons, Inc., 1983), pp. 764–798.
POLYMER, vol. 25. No. 20, pp. Dec. 31, 1994, pp. 4343–4348.
European Search Report for Appln. No. 01964457.4 dated May 25, 2004.

*Primary Examiner*—Leszek B Kiliman
(74) *Attorney, Agent, or Firm*—McDermott Will & Emery LLP

(57) ABSTRACT

A flexible film for packaging articles such as food is provided. The film comprises a layer of polyvinylidene ("PVdC") homopolymer, polyvinylidene and methyl acrylate ("PVdC-MA") copolymer or other polyvinylidene chloride copolymer. A dienophile such as, for example, ethyl trans-cinnamate, methyl trans-cinnamate, dibutyl maleate, dimethyl maleate or maleic anhydride is blended with the PVdC polymer or PVdC-MA copolymer to reduce yellowing of the film caused by degradation of the PVdC or PVdC-MA through heat or electron beam irradiation. Preferably a range of about 0.05% and about 5% by weight of the dienophile is added to the PVdC or PVdC-MA.

14 Claims, 1 Drawing Sheet

U.S. PATENT DOCUMENTS

| | | | |
|---|---|---|---|
| 4,137,383 A | | 1/1979 | Sagane et al. |
| 4,618,638 A | * | 10/1986 | Dexter et al. ............... 524/102 |
| 4,929,652 A | | 5/1990 | Gugumus |
| 5,035,955 A | * | 7/1991 | Matsukura et al. ........ 428/34.9 |
| 5,070,128 A | | 12/1991 | Gay |
| 5,149,723 A | | 9/1992 | Hayes |
| 5,164,268 A | | 11/1992 | Dollinger et al. |
| 5,244,949 A | | 9/1993 | Wirth et al. |
| 5,319,090 A | | 6/1994 | Macleay et al. |
| 5,322,947 A | | 6/1994 | Tanaka et al. |
| 5,324,834 A | | 6/1994 | Borzatta et al. |
| 5,325,719 A | | 7/1994 | Petri et al. |
| 5,336,706 A | | 8/1994 | Borzatta et al. |
| 5,444,110 A | | 8/1995 | Kitazawa et al. |
| 5,679,465 A | * | 10/1997 | Bekele .................... 428/474.4 |
| 5,804,622 A | | 9/1998 | Zinke et al. |
| 5,821,288 A | | 10/1998 | Avar et al. |
| 5,847,132 A | | 12/1998 | Borzatta et al. |
| 5,914,194 A | | 6/1999 | Bekele |
| 5,919,929 A | | 7/1999 | Tomei |
| 5,948,836 A | | 9/1999 | Bonora |
| 6,514,626 B1 | * | 2/2003 | Kaas et al. ................. 428/515 |

* cited by examiner

DIENOPHILE ADDITIVES TO POLYVINYLIDENE CHLORIDE COPOLYMERS

Continuation of prior application Ser. No. 09/649,895 filed Aug. 28, 2000 now U.S. Pat. No. 6,514,626.

FIELD OF THE INVENTION

The present invention relates to flexible film for packaging articles therein having a dienophile additive blended into a polyvinylidene chloride barrier layer. More specifically, the present invention relates to a flexible film having a plurality of layers including a barrier layer having properties that prevent molecular diffusion of gases and/or vapors. The barrier layer may be made from a copolymer of polyvinylidene and an alkyl acrylate, such as, for example, methyl acrylate. The dienophile additive may protect the barrier film from degradation caused by heat, light, such as UV radiation, and/or electron beam irradiation of the film structure.

BACKGROUND OF THE INVENTION

It is, of course, generally known to utilize a multilayer film structure having a plurality of desirable properties. For example, one of the layers in the multilayer film structure may be a barrier layer that prevents or otherwise restricts molecules of a gas, a vapor or a flavor of a food article from diffusing therethrough. The barrier layer may be a "core" of the multilayer film structure and may be surrounded by a number of other film layers, each of the layers having a plurality of characteristics. For example, an abuse layer may be provided on an outside of the film structure for adding a property that causes the film to resist tearing, scratching and/or cracking. Additionally, a sealant layer may be provided on an alternate surface of the film structure for providing a layer that may seal to itself or to other layers or articles upon heating. Further, multiple layers may be contained within the film structure having a plurality of "tie" or adhesive layers for bonding the internal layers, such as the barrier layer, to the abuse layer, the sealant layer or any other layer within the multilayer film structure.

A typical barrier layer may include a copolymer of polyvinylidene chloride ("PVdC") and an alkyl acrylate, such as, for example, methyl acrylate ("MA"). This flexible film formulation is typically referred to as MA-Saran and is produced by the Dow Chemical Company ("Dow"). The addition of methyl acrylate to PVdC provides improved thermal stability to the PVdC, as PVdC itself is relatively unstable at temperatures required for producing a film via, for example, blown-film or extrusion lamination. General information on PVdC, MA-Saran and other related films including properties thereof can be found in "Vinylidene Chloride and Poly(vinylidene Chloride)" Kirk-Othmer: *Encyclopedia of Chemical Technology*, 3$^{rd}$ Ed., Vol. 23 (New York: John Wiley & Sons, Inc. 1983), pp.764–798.

Although PVdC is relatively useful due to its low permeability to gases and vapors such as oxygen and water vapor, its thermal instability results in degradation at temperatures at or around the melt temperatures of the PVdC-MA. Further, irradiation of the film layers for cross-linking of polymer chains within adjacent layers of the multilayer films may cause PVdC to degrade as well. Light, such as UV radiation, may also cause the PVdC to degrade. The degradation reaction may produce HCl as a by-product along with the formation of a conjugated polyene. While the addition of the alkyl acrylate reduces the degradation process, heat and/or radiation still may cause significant degradation.

The degradation reaction generally proceeds as follows:

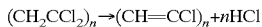

$$(CH_2CCl_2)_n \rightarrow (CH=CCl)_n + nHCl$$

In addition to the production of hazardous by-products such as HCl, the degradation may also cause a decrease in the crystallinity of PVdC polymer or copolymer structure, thereby increasing the potential for gas or vapor transmission therethrough. Therefore, the heat necessary to extrude PVdC or bond other layers to the barrier layer, as well as radiation utilized to cause cross-linking, may lower the quality of PVdC as a barrier material.

In addition, the formation of conjugated polyenes causes a film produced by PVdC to discolor from clear to yellow. If enough degradation occurs, PVdC film may turn brown or black. Specifically, optical properties of the film are greatly reduced due to the degradation of PVdC by heat, light or electron beam irradiation.

As noted in the Kirk-Othmer article, stabilizing PVdC is fairly developed. Specifically, dienophiles such as, for example, maleic anhydride and dibasic lead maleate, have been found to prevent discoloration of PVdC films by reacting with and stabilizing the color-producing conjugated dienes within the polymer. Dienophiles generally stabilize these conjugated polyenes by reacting with the double bonds in multiple Diels-Alder reactions. The reactions remove the conjugated double bonds, thereby improving the properties of the film, especially optical clarity. A further advantage of using a dienophile is that HCl remains within the film thereby slowing the progress of the reaction.

However, formulations of PVdC with dienophiles besides the ones mentioned above have rarely been utilized up to this point. U.S. Pat. No. 5,679,465 to Bekele teaches using a dienophile that is a copolymer having an anhydride moiety. Specifically, Bekele discloses a dienophilic terpolymer having olefinic, acrylic, and anhydride comonomers, or a grafted copolymer of maleic anhydride. Further, a preferred embodiment of Bekele includes an ethylene/alkyl acrylate/maleic anhydride terpolymer, such as ethylene/butyl acrylate/maleic anhydride terpolymer. However, dienophilic copolymers are difficult to use and may interfere with the crystallinity of the PVdC film matrix, hereby decreasing the barrier properties of the film. Further, cheaper and more effective dienophiles, along with processes of combining the dienophiles with the PVdC formulation are necessary.

Therefore, a need exists for an improved PVdC formulation having dienophiles incorporated therein for flexible film packaging that will react with conjugated polyenes formed by the degradation of PVdC by heat, light and electron beam irradiation. Further an improved flexible film package and method of manufacturing the same is needed.

SUMMARY OF THE INVENTION

The present invention relates to a flexible film comprising a layer of polyvinylidene chloride and a dienophile additive for reacting with the conjugated polyene degradation product to improve the barrier properties and optical properties of the film. Further, a package for an article and a method of manufacturing the same are also provided.

To this end, in an embodiment of the present invention, a flexible film is provided comprising a plurality of layers wherein a first layer comprises polyvinylidene chloride and a dienophile additive in the first layer of polyvinylidene chloride.

In another embodiment of the present invention, the dienophile additive is selected from the group consisting of a maleate, a cinnamate, and maleic anhydride.

In another embodiment of the present invention, the dienophile additive is between about 0.05% and about 5% by weight ethyl trans-cinnamate.

In another embodiment of the present invention, the dienophile additive is between about 0.05% and about 5% by weight dibutyl maleate.

In another embodiment of the present invention, the dienophile additive is between about 0.05% and about 5% by weight methyl trans-cinnamate.

In another embodiment of the present invention, the dienophile additive is between about 0.05% and about 5% by weight dimethyl maleate.

In another embodiment of the present invention, the dienophile additive is between about 0.05% and about 5% by weight maleic anhydride.

In another embodiment of the present invention, the polyvinylidene chloride is a copolymer with methyl acrylate.

In another embodiment of the present invention, the flexible film includes an outer layer disposed on a first surface of the film structure and a sealant layer disposed on a second surface of the film structure.

In another embodiment of the present invention, the flexible film includes an outer adhesive layer for bonding the first layer of polyvinylidene chloride and the dienophile to the outer layer and an inner adhesive layer for bonding the first layer of polyvinylidene chloride and the dienophile to the sealant layer.

In another embodiment of the present invention, the outer layer and the outer adhesive layer are polymer blends of linear low density polyethylene and ethylene-vinyl acetate copolymer In another embodiment of the present invention, the inner adhesive layer is linear low density polyethylene.

In another embodiment of the present invention, the sealant layer is a copolymer of ethylene-vinyl acetate.

In an alternate embodiment of the present invention, a flexible film package for a food article is provided. The flexible film package includes a flexible film having a plurality of layers contained therein wherein a first layer comprises polyvinylidene chloride and a dienophile additive wherein the dienophile is selected from the group consisting of a maleate, a cinnamate and maleic anhydride.

In another embodiment of the present invention, the dienophile additive is between about 0.05% and about 5% ethyl trans-cinnamate.

In another embodiment of the present invention, the dienophile additive is between about 0.05% and about 5% dibutyl maleate.

In another embodiment of the present invention, the dienophile additive is between about 0.05% and about 5% methyl trans-cinnamate.

In another embodiment of the present invention, the dienophile additive is between about 0.05% and about 5% dimethyl maleate.

In another embodiment of the present invention, the dienophile additive is between about 0.05% and about 5% by weight maleic anhydride.

In another embodiment of the present invention, the first layer is made from a copolymer of polyvinylidene chloride and methyl acrylate.

In another embodiment of the present invention, the flexible film package includes outer layers of the flexible film wherein the outer layers include an abuse layer and a sealant layer and adhesive layers between the outer layers and the first layer.

In another embodiment of the present invention, the abuse layer is a polymer blend of linear low density polyethylene and ethylene-vinyl acetate copolymer.

In an alternate embodiment of the present invention, a method of making a flexible film includes providing polyvinylidene chloride, blending a dienophile with the polyvinylidene chloride wherein the dienophile is selected from the group consisting of a cinnamate, a maleate, and maleic anhydride, and extruding the polyvinylidene chloride/dienophile blend through a die to make a film.

In another embodiment of the present invention, the polyvinylidene chloride/dienophile blend is coextruded with a plurality of melt streams to produce a plurality of layers.

In another embodiment of the present invention, between about 0.05% and about 5% by weight of the dienophile is blended with the polyvinylidene chloride.

It is, therefore, an advantage of the present invention to provide a flexible film, a package and a method of manufacturing the same that includes a dienophile additive for reacting with conjugated double bonds within the polymer structure.

Further, an advantage of the present invention is to provide a flexible film, a package and a method of manufacturing the same that improves the barrier properties of the film. Still further, an advantage of the present invention is to provide a flexible film, a package and a method of manufacturing the same that improves the optical properties of the film.

And, an advantage of the present invention is to provide a flexible film, a package and a method of manufacturing the same that blends the dienophile additive with PVdC prior to extrusion of the film. In addition, an advantage of the present invention is to provide a flexible film, a package and a method of manufacturing the same that provides for continuous improvements to the barrier film for a time after the film has been extruded and irradiated.

An additional advantage of the present invention is to provide a flexible film, a package and a method of manufacturing the same that reacts with the conjugated polyenes of the degradation product but leaves HCl within the system to slow the progression of the degradation reaction.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
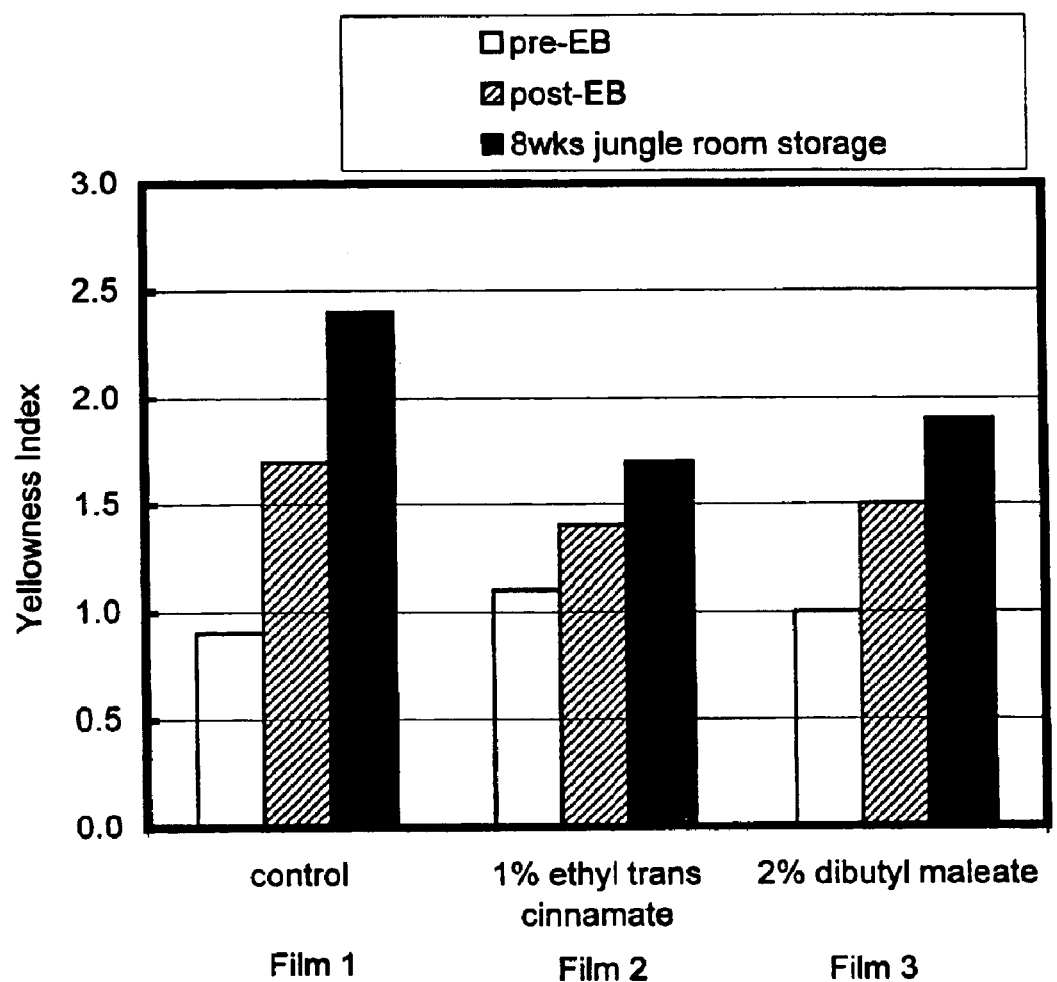
FIG. 1 illustrates a chart showing a control film, a film having 1% by weight ethyl trans-cinnamate and a film having 2% by weight dibutyl maleate and the respective yellowness factors of the films before electron beam irradiation, after electron beam irradiation and after eight weeks.

The present invention relates to a flexible film made comprising a layer of PVdC having a dienophile additive for reacting with the conjugated polyene degradation product to improve the barrier and optical properties of the film. Further, a package for an article and a method of manufacturing the same are provided.

In a preferred embodiment of the present invention, the addition of a dienophile to PVdC-MA, commonly known as MA-Saran, available from Dow Chemical Company, Midland, Mich., reduces yellowing of films made therefrom due to degradation of the PVdC by heat, light and electron beam irradiation. PVdC-MA may contain any amount of polyvinylidene chloride and methyl acrylate as may be apparent to those skilled in the art.

However, a preferred weight ratio for PVdC-MA may be about 97.25 wt % vinylidene chloride and about 7.75 wt % methyl acrylate, with the resultant copolymer having a molecular weight of between about 90,000 to 92,000 g/mol. It should be noted, however, that any molecular weight PVdC copolymer or homopolymer may be used as well. The invention should not be limited to copolymers and/or homopolymers having a molecular weight of between about 90,000 and 92,000 g/mol. Further, other components may be contained within the PVdC-MA copolymer formulation to aid in extrusion or blowing of the film during the film-making process, such as, for example, slip agents, anti-static agents and any other additive apparent to those skilled in the art. It should be noted that the addition of the dienophile is not meant to be limited to PVdC-MA copolymer. Other PVdC copolymers that may degrade to a conjugated polyene may be utilized as well. In addition, PVdC homopolymer may also be utilized in this invention. However, PVdC homopolymer is notoriously difficult to make films therefrom as PVdC homopolymer tends to degrade rapidly at temperatures necessary for the film making process.

During a typical well known method of creating shrink-wrap films called the double-bubble blown film process, a multilayer film having PVdC-MA as a barrier may be coextruded in an annular die and air-blown to create a first bubble. The first bubble may be quenched by immersion into a cold bath to create a film. The bubble may then be collapsed and fed through a reheat bath or any other reheating method, such as, for example, infrared radiation, to be blown into a second bubble causing the film to orient biaxially. The second bubble may then be collapsed and fed to a wind up cylinder. This particular method is useful for making shrink-wrap bags by maintaining the film as a collapsed tube. However, films may be made by trimming the collapsed second bubble before feeding to wind up cylinders. The film may then be fed through an electron beam irradiation chamber for cross-linking of polymer chains within adjacent layers of the multilayer film. For example, ethylene-vinyl acetate copolymer may readily cross-link to produce a layer of film having particular characteristics such as, for example, greater tensile strength.

However, heat during the film-making process, the electron beam bombardment and light, such as, for example, UV light, cause formation of conjugated polyenes and evolution of HCl within the PVdC-MA film thereby causing significant yellowing. For example, as seen in FIG. 1, the control film includes no dienophile and has significant yellowing during all three phases: pre-electron beam irradiation; post-electron beam irradiation; and after eight weeks in a humid environment. Therefore, while significant yellowing occurs after the film-making process and after electron beam irradiation, yellowing continues over time.

It has been found, however, that the addition of a dienophile to the PVdC-MA copolymer may reduce the yellowing of the film. For example, the addition of a 1% by weight of the dienophile significantly reduces the yellowing of the films. As shown in FIG. 1, the films having an amount of dienophile show a reduction in yellowing as compared to the control. Films 2 and 3 include 1% by weight of ethyl trans-cinnamate and 2% by weight dibutyl maleate, respectively. FIG. 1 shows reduced yellowing of the resultant films, particularly after electron-beam irradiation. Further, the addition of the dienophiles slows the rate of yellowing over time, as shown by the decrease in yellowing for both films with the dienophile additive relative to the control film. The yellowness index was measured using the ASTM D1925 standard and is expressed, according to FIG. 1, in units of yellowness index ("YI").

While the amount of the dienophile that may be added to the PVdC-MA copolymer may be any amount apparent to those having skill in the art, a preferred embodiment has dibutyl maleate 2% by weight added to the PVdC-MA copolymer. However, according to FIG. 1, ethyl trans-cinnamate tends to work better at lower amounts than other dienophiles, such as dibutyl maleate, it may have a significant odor when coextruded with PVdC-MA. This odor may interfere with flavors contained in food items stored within films made from PVdC-MA/ethyl trans-cinnamate. Dibutyl maleate produced, for example, by Nova Chemical Corp. and marketed under the name Novaflex™ DBM, may be added as a liquid to granules of PVdC-MA prior to extrusion of the PVdC-MA to produce the film. While a preferred embodiment includes 2% by weight dibutyl maleate, the amount of dienophile may be any that may cause a decrease in yellowing of the PVdC-MA film produced as may be apparent to those skilled in the art. An effective range of dienophile may be between 0.05% and 5% by weight dienophile within the PVdC-MA film.

Other dienophiles may be utilized having structures similar to dibutyl maleate or ethyl trans-cinnamate to provide stability to the PVdC-MA films. For example, molecules having the generic maleate structure $R_1OOCCH=CHCOOR_2$ or the generic cinnamate structure $C_6H_5CH=CHCOOR$, where R may be any number of carbon atoms, may be utilized. Further, maleic anhydride may be utilized as the dienophile within the PVdC-MA film. It should be noted, however, that any compound may be used that reacts with the conjugated double bonds of the PVdC-MA degradation product in a Diels-Alder type reaction to remove the conjugated polyene and improve the properties of the barrier layer.

In another embodiment of the present invention, a multilayer film may be produced using PVdC-MA with a dienophile additive as a barrier layer. Other layers may include an abuse layer on an outside surface of the multilayer structure, a sealant layer on an opposite surface of the multilayer structure, and adhesive on the layers disposed between the barrier layer and the outside layers of the multilayer structure. Table 1 shows a preferred embodiment of the multilayer structure whereby LLDPE represents linear low density polyethylene and EVA represents ethylene-vinyl acetate copolymer:

| Layer | Components | Layer Thickness (mils) |
|---|---|---|
| Outer | LLDPE/EVA | .55 |
| Outer Tie | LLDPE/EVA | .20 |
| Barrier | PVdC-MA + dienophile | .20 |
| Inner Tie | LLDPE | 1.10 |
| Sealant | EVA | .25 |

Of course, other layers may be included in the multilayer structure to provide other desirable properties as may be apparent to those skilled in the art. Further, the layers may be any thickness and should not be limited as noted above with reference to Table 1.

The multilayer film structure may form a flexible film that may be utilized in any way to create a package having an inner compartment that may be separated from air or other gases and vapors. The dienophile additive may be added to the PVdC-MA granules prior to melting of the granules and extrusion of the resultant melt stream. The PVdC-MA/dienophile blend may then be coextruded and/or laminated with a plurality of other polymer melt streams to produce a multilayer film. The multilayer film structure may be extruded and blown using the double bubble process or any other process, such as tentering, to produce shrink-wrap bags that may surround an article such as, for example, a food item. The shrink-wrap bags may be heated to cause the bags to shrink around the food item thereby protecting the food item from oxidating chemicals such as oxygen gas, water vapor, or other damaging molecules. However, the PVdC-MA/dienophile barrier layer may be incorporated into any type of flexible film, including flexible films created by coextrusion lamination, adhesive lamination, cast sheet extrusion, tubular water quenched extrusion, air blown extrusions or any other like film-making process. Further, the PVdC-MA/dienophile blend may be incorporated into any other layer besides the barrier layer depending on the characteristics of the film desired.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A flexible film comprising:
   a plurality of layers wherein a first layer comprises polyvinylidene chloride; and
   a dienophile additive comprising a cinnamate in the first layer of polyvinylidene chloride wherein the cinnamate is selected from the group consisting of ethyl trans-cinnamate and methyl trans-cinnamate.

2. The flexible film of claim 1 wherein the polyvinylidene chloride comprises a copolymer with methyl acrylate.

3. The flexible film of claim 1 further comprising:
   an outer layer disposed on a first surface of the first layer; and
   a sealant layer disposed on a second surface of the first layer.

4. The flexible film of claim 3 further comprising:
   an outer adhesive layer for bonding the first layer of polyvinylidene chloride and the dienophile to the outer layer; and
   an inner adhesive layer for bonding the first layer of polyvinylidene chloride and the dienophile to the sealant layer.

5. The flexible film of claim 4 wherein the outer layer and the outer adhesive layer comprise polymer blends of linear low density polyethylene and ethylene-vinyl acetate copolymer.

6. The flexible film of claim 4 wherein the inner adhesive layer comprises linear low density polyethylene.

7. The flexible film of claim 4 wherein the sealant layer comprises a copolymer of ethylene-vinyl acetate.

8. A flexible film package for a food article comprising:
   a flexible film having a plurality of layers contained therein wherein a first layer comprises polyvinylidene chloride and a dienophile additive comprising a cinnamate wherein the cinnamate is selected from the group consisting of ethyl trans-cinnamate and methyl trans-cinnamate.

9. The flexible film package of claim 8 wherein the outer layer comprises a copolymer of polyvinylidene chloride and methyl acrylate.

10. The flexible film package of claim 8 further comprising:
    outer layers of the flexible film wherein the outer layers include an abuse layer and a sealant layer; and
    adhesive layers between the outer layers and the first layer.

11. The flexible film of claim 10 wherein the abuse layer comprises a polymer blend of linear low density polyethylene and ethylene-vinyl acetate copolymer.

12. A method of making a flexible film, the method comprising the steps of:
    providing polyvinylidene chloride;
    blending a dienophile with the polyvinylidene chloride to produce a polyvinylidene chloride/dienophile blend wherein the dienophile is selected from the group consisting of ethyl trans-cinnamate and methyl trans-cinnamate; and
    extruding the polyvinylidene chloride/dienophile blend through a die to make a film.

13. The method of claim 12 further comprising the steps of:
    coextruding the polyvinylidene chloride/dienophile blend with a plurality of melt streams to produce a plurality of layers.

14. The method of claim 12 further comprising the steps of:
    blending between about 0.05% and about 5% by weight of the dienophile to the polyvinylidene chloride polymer.

* * * * *